United States Patent [19]

Blackmore

[11] 4,063,647
[45] Dec. 20, 1977

[54] HOLDER FOR STORING BICYCLES AND THE LIKE

[76] Inventor: Donald W. Blackmore, 3702 La Colmena, Los Alamitos, Calif. 90720

[21] Appl. No.: 714,487

[22] Filed: Aug. 16, 1976

[51] Int. Cl.² .................................................. A47F 7/04
[52] U.S. Cl. ...................................... 211/19; 248/316 D
[58] Field of Search ................... 211/18, 19; 248/113, 248/148, 188.2, 207, 316 D

[56] References Cited

U.S. PATENT DOCUMENTS

| 591,078 | 10/1897 | Jewell et al. ............................ 211/23 |
| 599,645 | 2/1898 | Snyder .................................... 211/19 |
| 713,888 | 11/1902 | Kellner ........................... 248/316 D X |
| 1,906,874 | 5/1973 | Platt ............................... 248/316 D X |
| 2,795,834 | 6/1957 | Szoke ............................. 248/316 D X |
| 3,452,663 | 7/1969 | Machtig ........................ 248/188.2 X |
| 3,595,513 | 7/1971 | Rehlaender ....................... 248/148 X |
| 3,682,523 | 8/1972 | Esposito .................................. 211/23 |

FOREIGN PATENT DOCUMENTS 867,753  5/1961  United Kingdom ................... 211/19

*Primary Examiner*—William H. Schultz

[57] ABSTRACT

A holder is provided for storing bicycles and the like in a position with one wheel above the other to minimize use of floor space. The holder is adjustable to accommodate various wheel sizes.

1 Claim, 6 Drawing Figures

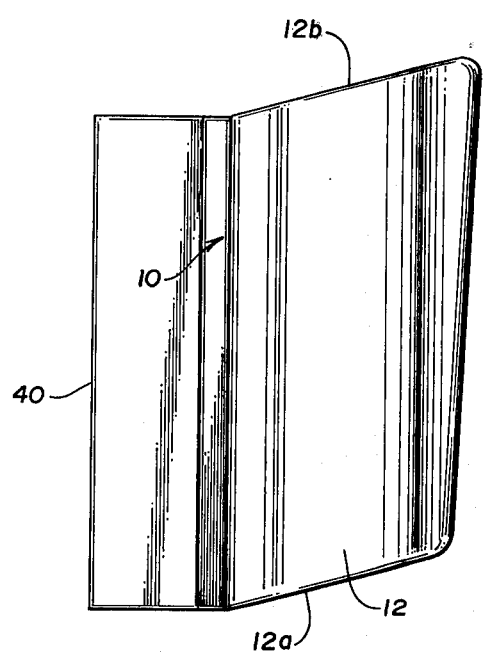
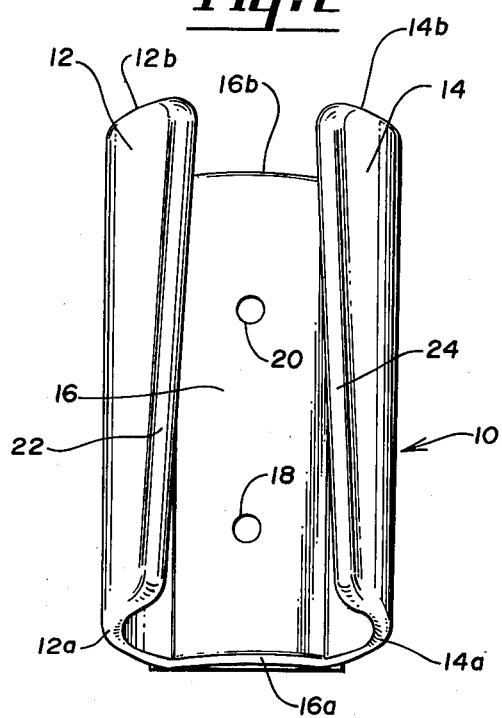
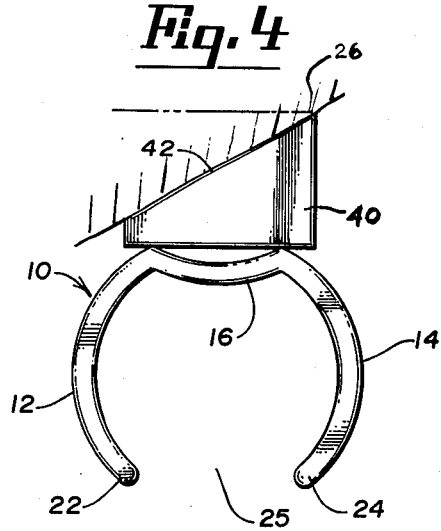
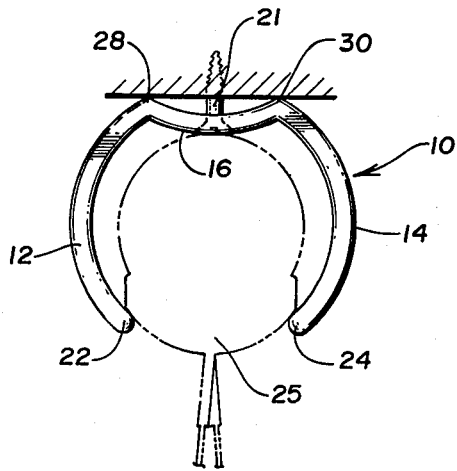
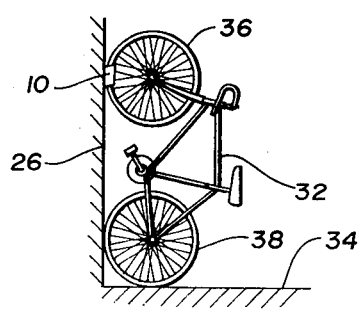

HOLDER FOR STORING BICYCLES AND THE LIKE

BACKGROUND OF THE INVENTION

The present invention relates to a holder for storing bicycles and the like in a position with one wheel above the other and particularly to a holder that is adjustable to accomodate various wheel sizes.

The popularity of the bicycle as a means of transportation and recreation has given rise to the problem of storing the vehicles when not in use. Various means have been devised in an effort to solve the problem. For example, hooks have been attached to the ceiling of a garage or other storage area, sometimes accompanied by a system of pulleys for raising the bicycle to the hooks in position for hanging. Prior devices have either required the lifting of the entire weight of the bicycle to the storage device, or have employed relatively complicated means for doing so.

SUMMARY OF THE INVENTION

The present invention provides a simple, inexpensive, easily mounted holder for storing bicycles. The device, which has an elongated body comprising a pair of opposed side walls which are preferably curved to conform generally to opposed sides of an ellipse and a back wall connecting the side walls and projecting forwardly therefrom. The forward edges form a pair of jaws which define an opening dimensioned to receive a portion of a bicycle wheel. Simple means are provided for adjusting the width of the opening to accommodate different wheel sizes or to adjust the tension of the jaws on a given size wheel.

BRIEF DESCRIPTION OF THE DRAWING

A further understanding may be had by reference to the accompanying drawing in which like numbers refer to like parts in the several views and in which:

FIG. 1 is a side view of a holder incorporating features of the invention;

FIG. 2 is a front view of the device shown in FIG. 1;

FIG. 3 is a top view thereof;

FIG. 4 is a bottom view thereof;

FIG. 5 is a side view of a bicycle being held in place by the holder of my invention.

FIG. 6 is a plan view showing several holders arranged to store a number of bicycles in close proximity to each other.

Before explaining the invention in detail, it is to be understood that the invention is not limited in its application to the details of construction and arrangement of parts set forth in the following general description or illustrated in the accompanying drawings, since the invention is capable of other embodiments and of being practical or carried out in various ways. Also, it is to be understood that the phraseology or terminology employed herein is for the purpose of description and not limitation.

GENERAL DESCRIPTION

Referring to the drawing, there is shown a holder generally designated by the numeral 10. It is preferably molded in one-piece of a relatively resilient thermoplastic material. The holder is elongated and comprises opposed side walls 12 and 14 and a back wall 16 extending between the side walls. The side walls 12 and 14 are curved and preferably are formed to conform to the outline of opposed sides of an ellipse. The back wall 16 is curved inwardly toward the front of the holder for a purpose to be described more fully hereinafter and includes at least a pair of apertures 18 and 20 dimensioned to receive suitable means, e.g., screws 21, for fastening the holder to a mounting surface such as a wall.

The forward positions of the side walls 12 and 14 terminate in a pair of opposed jaws 22 and 24 which converge toward each other from bottom to top. The lower edges 12a and 14a of the side walls 12 and 14 preferably extend outwardly and upwardly from the lower edge 16a of the back wall 16. Likewise, the upper edges 12b and 14b of the side walls 12 and 14 extend outwardly and upwardly from the upper edge 16b of the back wall 16.

The holder 10 is mounted on a wall 26 or other suitable surface at a height to enable a bicycle to be stored in an upright position with the front wheel above the rear wheel as shown in FIG. 5. The holder is secured in the position shown in the drawings by means of screws 21. The screws also provide means for adjusting the size of the opening 25 to accommodate tires or wheels of varying cross-sectional diameters, or to adjust the holding tension on a given tire or wheel. To effect the largest opening 25 between the jaws 22 and 24, the screws 21 are merely tightened enough to secure the holder snugly to the wall. Because of the reverse curvature of the back wall 16, further tightening of the screws 21 will draw the back wall 16 of the holder inwardly toward the mounting surface 26. This action forces the jaws 22 and 24 of the side walls closer together, thereby decreasing the width of the opening 25. In addition, the upper or lower screw can be adjusted independently of the other to adjust the opening in the upper or lower portion of the jaws and thereby the tension desired.

In operation, the bicycle 32 is pushed along the floor 34 until the front wheel 36 touches the wall 26. The front wheel is then rolled up the wall until the wheel engages the lower edges of the jaws 22 and 24. Continued upward movement causes the jaws to separate progressively until the tire and wheel passes the upper edge of the jaws 22 and 24. The jaws then return to their initial position, now surrounding the tire and part of the rim. As best shown in FIG. 3, the generally elliptical outline of the side walls enables the jaws to grip on the rim rather than on the tire alone. This prevents accidental removal of the wheel from the holder in the event of deflation of the tire.

With the bicycle held in the storage position as shown in FIG. 5, its rear wheel is supported horizontally by the wall 26 and vertically by the floor 34. Also, lateral movement of the front wheel 36 restrained in all directions by the holder 10.

It should be apparent that the tapering of the jaws 22 and 24 facilitates entry of the wheel into the opening 25. In addition, the tapering of the lower edges 12a and 14a upwardly and outwardly from the lower edge of the back wall increases the rigidity of the lower portion of the jaws 22 and 24. Conversely, the tapering of the upper edges 12b and 14b of the side walls upwardly and outwardly from the upper edge 16b of the back wall decreases the rigidity of the upper portion of the jaws 12 and 14. The increased rigidity in the lower portion of the jaws provides for more positive gripping once the front wheel is in place. The decreased rigidity in the upper portion of the jaws facilitates release of the wheel from the holder.

It should also be apparent that the majority of the weight of the bicycle is supported on the floor during placement and removal from the holder and, accordingly, very little lifting is required.

FIG. 5 shows a bicycle stored in a place normal to that of the wall 26. The holder may also be provided with a mounting block 40 having a beveled edge 42, as shown in FIG. 4, which permits a bicycle to be stored in a place forming an acute angle with the wall 26 thereby saving additional floor space or permitting several holders to be mounted adjacent each other to store bicycles in a pattern such as that shown in FIG. 6.

The inclusion of mounting blocks with bevels will enable several bicycles to be stored in positions shown in FIG. 6 merely by choosing the proper orientation and shapes of the mounting blocks.

I claim:

1. A holder for attachment to a mounting surface for use in storing bicycles and the like in a position with one wheel above the other, said holder comprising elongated opposed side walls having lower and upper edges, an elongated back wall connecting said side walls and projecting forwardly from the rearward edges of said side walls to form a pair of jaws defining an opening adapted to receive a portion of one of said wheels, each of said jaws having a top and a bottom and said jaws being tapered to converge at their tops; the lower edges of said side walls extending outwardly and upwardly from the lower edge of said back wall and the upper edges of said side walls extending outwardly and upwardly from the upper edge of said back wall; means on said back wall for securing said holder to said mounting surface, and means for adjusting the width of said opening by urging said back wall toward or away from said mounting surface; said mounting and adjusting means comprising an upper and a lower aperture in said back wall and screws of a dimension to be received in each of said apertures, so that tightening said screws electively will force said back wall toward said mounting surface thereby urging said jaws closer together and loosening said screws will permit said back wall to move outwardly from said mounting surface thereby urging said jaws farther apart.

* * * * *